United States Patent
Yang et al.

(10) Patent No.: US 8,350,822 B2
(45) Date of Patent: Jan. 8, 2013

(54) TOUCH PAD OPERABLE WITH MULTI-OBJECTS AND METHOD OF OPERATING SAME

(75) Inventors: Wei-Wen Yang, Hsinchu (TW); Chih-Min Liu, Hsinchu (TW); Jian-Wei Chen, Hsinchu (TW)

(73) Assignee: Elan Microelectronics Corp., Hsinchu (TW)

( * ) Notice: Subject to any disclaimer, the term of this patent is extended or adjusted under 35 U.S.C. 154(b) by 0 days.

(21) Appl. No.: 13/345,726

(22) Filed: Jan. 8, 2012

(65) Prior Publication Data
US 2012/0105351 A1    May 3, 2012

Related U.S. Application Data

(62) Division of application No. 12/057,883, filed on Mar. 28, 2008, now abandoned.

(51) Int. Cl.
*G06F 3/041* (2006.01)
(52) U.S. Cl. ............... 345/173; 345/174; 178/18.01; 715/863
(58) Field of Classification Search .......... 345/173–178; 178/18.01–18.09; 715/863
See application file for complete search history.

(56) References Cited

U.S. PATENT DOCUMENTS

| 7,138,983 B2 * | 11/2006 | Wakai et al. ............. 345/173 |
| 2008/0158183 A1 * | 7/2008 | Hotelling et al. ......... 345/173 |

OTHER PUBLICATIONS

["Trig Cheat Sheet", Paul Dawkins, 2005].*
["Lesson 3: Right Triangle Trigonometry", Thomas E. Price, Aug. 16, 2001].*
["Inverse Trigonometric Functions", David W. Sabo, 2003].*

* cited by examiner

*Primary Examiner* — Amare Mengistu
*Assistant Examiner* — Koosha Sharifi-Tafreshi
(74) *Attorney, Agent, or Firm* — Chun-Ming Shih (57) ABSTRACT

The present invention provides a touch pad operable with multi-objects and a method of operating such a touch pad. The touch pad includes a touch structure for sensing touch points of a first and a second object and a controller for generating corresponding touching signals and related position coordinates. Moreover, the controller calculates at least two movement amount indexes according to coordinate differences between these position coordinates, thereby generating a movement amount control signal to control behaviors of a software object.

6 Claims, 13 Drawing Sheets

TOUCH PAD OPERABLE WITH MULTI-OBJECTS AND METHOD OF OPERATING SAME

CROSS-REFERENCE TO RELATED APPLICATION

This is a divisional application of an application Ser. No. 12/057,883, filed on Mar. 28, 2008 now abandoned. The aforementioned patent application is herein incorporated by reference in its entirety.

FIELD OF THE INVENTION

The present invention relates to a touch pad, and more particularly to a touch pad operable with multi-objects. The present invention also relates to a method of operating such a touch pad.

BACKGROUND OF THE INVENTION

Nowadays, consumable electronic products with touch pads or touch panels are becoming increasingly popular because of their ease and versatility of operation. A representative electronic product with a touch panel is for example an iPhone, which is a mobile phone designed and marketed by Apple Inc. For helping the user well operate the electronic products, the touch sensing interfaces of the electronic products are developed in views of humanization and user-friendliness.

Conventionally, by simply touching the surface of the touch sensing interface with a finger, the user can make selections and move a cursor. Nowadays, with increasing demand of using the touch sensing interface as a control unit, operating the touch pads or touch panels with only one finger is not satisfied. As a consequence, touch sensing interfaces operated with two fingers have been developed. Take the iPhone for example. It is possible to zoom in and out of web pages or photos by placing two fingers on the touch sensing interface and spreading them farther apart or closer together, as if stretching or squeezing the image. The iPhone interface, however, enables the user to move the content up/down or leftward/rightward or rotate the content by a touch-drag motion of a single finger.

Although the iPhone interface makes it easy to zoom in or out of images by spreading two fingers farther apart or closer together, there are still some drawbacks. For example, since the software for reading out the user's gestures is based on complicated moving control means, there is a need of providing a simplified method for quickly reading out the user's gestures. In the present invention, capacitive or resistive touch pads are concerned.

Moreover, since the software object is moved up/down or leftward/rightward or rotated by moving a single finger on the touch sensing interface, it is necessary to rotate the software object at a specified angle or move the software object along multi-directions with two fingers. Therefore, there is also a need of rotating the software object at a specified angle or moving the software object along multi-directions with two fingers.

SUMMARY OF THE INVENTION

The present invention provides a method of operating a touch pad with at least two fingers to move the software object up/down or leftward/rightward, rotate the software object at a specified angle, and zoom in/out of the software object.

The present invention further provides a touch pad operable with at least two fingers to move the software object up/down or leftward/rightward, rotate the software object at a specified angle, and zoom in/out of the software object.

In accordance with an aspect of the present invention, there is provided a method of operating a touch pad with multi-objects. First of all, touch points of first and second objects on the touch pad are sensed to assert a first position coordinate (X1, Y1) and a second position coordinate (X2, Y2), respectively. Then, the second object is moved on the touch pad to a further touch point, and the further touch point is sensed to assert a third position coordinate (X3, Y3). According to coordinate differences between the first, second and third position coordinates, a first slope S12 according to said first position coordinate (X1, Y1) and said second position coordinate (X2, Y2) is measured as a first movement amount index, a second slope S13 according to said first position coordinate (X1, Y1) and said third position coordinate (X3, Y3) is measured as a second movement amount index, and a third slope S23 according to said second position coordinate (X2, Y2) and said third position coordinate (X3, Y3) is measured as a third movement amount index. Afterwards, a movement amount control signal is generated according to said first slope S12, said second slope S13, said third slope S23, said first position coordinate (X1, Y1), said second position coordinate (X2, Y2) and said position coordinate (X3, Y3).

In an embodiment, the first object is a first finger, the second object is a second finger, and the first, second and third position coordinates are obtained in an absolute two-dimensional coordinate system or a relative two-dimensional coordinate system.

In an embodiment, the method further includes the following steps. If $S12 \geq 0$, $S13 \geq 0$, $S23 < 0$, $(Y2-Y3) > 0$ and $(X2-X3) < 0$, or if $S12 \leq 0$, $S13 \leq 0$, $S23 > 0$, $(Y2-Y3) < 0$ and $(X2-X3) < 0$, the movement amount control signal is generated to control a first rotational action of the software object. Whereas, if $S12 \geq 0$, $S13 \geq 0$, $S23 < 0$, $(Y2-Y3) < 0$ and $(X2-X3) > 0$, or if $S12 \leq 0$, $S13 \leq 0$, $S23 > 0$, $(Y2-Y3) > 0$ and $(X2-X3) > 0$, the movement amount control signal is generated to control a second rotational action of the software object. For example, the first rotational action and the second rotational action are respectively a clockwise rotational action and a counterclockwise rotational action. The software object is a volume control key and the behaviors of the software object include displacement amount and displacement direction of the volume control key. Alternatively, the software object is a digital image and the behaviors of the software object include rotational amount and rotational direction of the digital image.

In an embodiment, the method further includes the following steps. If $S12 \geq 0$, $S13 \geq 0$, $S23 \geq 0$, $(X2-X1) > (X3-X1)$, and $(Y2-Y1) > (Y3-Y1)$, or if $S12 < 0$, $S13 < 0$, $S23 < 0$, $(X2-X1) > (X3-X1)$, and $(Y2-Y1) > (Y3-Y1)$, the movement amount control signal is generated to control a first zoom in/out action of the software object. Whereas, if $S12 \geq 0$, $S13 \geq 0$, $S23 \geq 0$, $(X2-X1) < (X3-X1)$, and $(Y2-Y1) < (Y3-Y1)$, or if $S12 < 0$, $S13 < 0$, $S23 < 0$, $(X2-X1) < (X3-X1)$, and $(Y2-Y1) < (Y3-Y1)$, the movement amount control signal is generated to control a second zoom in/out action of the software object. For example, the first zoom in/out action and the second zoom in/out action are respectively a zoom out action and a zoom in action. The software object is a digital image, and the behaviors of the software object include zoom in/out amount and zoom in/out direction of the digital image.

In an embodiment, the method further includes the following steps. The first object is moved on the touch pad to a further touch point, and the further touch point is sensed to assert a fourth position coordinate (X4, Y4). Then, a fourth slope S14 according to said first position coordinate (X1, Y1) and said fourth position coordinate (X4, Y4) is measured as a fourth movement amount index, and a fifth slope S43 according to said fourth position coordinate (X4, Y4) and said third position coordinate (X3, Y3) is measured as a fifth movement amount index.

In an embodiment, the method further includes the following steps. If S12≧0, S23≧0, S14≧0, S43≧0, (X2-X1)>(X3-X4), and (Y2-Y1)>(Y3-Y4), or if S12<0, S23<0, S14<0, S43<0, (X2-X1)>(X3-X4), and (Y2-Y1)>(Y3-Y4), the movement amount control signal is generated to control a first zoom in/out action of the software object. Whereas, if S12≧0, S23≧0, S14≧0, S43≧0, (X2-X1)<(X3-X4), and (Y2-Y1)< (Y3-Y4), or if S12<0, S23<0, S14<0, S43<0, (X2-X1)<(X3-X4), and (Y2-Y1)<(Y3-Y4), the movement amount control signal is generated to control a second zoom in/out action of the software object. For example, the first zoom in/out action and the second zoom in/out action are respectively a zoom out action and a zoom in action. The software object is a digital image, and the behaviors of the software object include zoom in/out amount and zoom in/out direction of the digital image.

In accordance with another aspect of the present invention, there is provided a touch pad operable with multi-objects. The touch pad is communicated with a host and a display body, and includes a touch structure and a controller. The touch structure has a lower surface communicated with the display body and an upper surface for sensing touch points. When touch points of first and second objects on the touch pad are sensed, first and second touching signals are respectively generated. When the second object is moved on the touch pad to a further touch point and the further touch point is sensed, a third touching signal is generated. The controller is electrically connected to the touch structure and the host for receiving the first, second and third touching signals and generating a first position coordinate (X1, Y1), a second position coordinate (X2, Y2) and a third position coordinate (X3, Y3), respectively. The controller calculates a first slope S12, a second slope S13 and a third slope S23 according to coordinate differences between the first, second and third position coordinates, thereby generating a movement amount control signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Hereinafter, an embodiment of operating a touch pad according to a first preferred embodiment of the present invention will be illustrated with reference to the flowchart of FIG. 1 and the two-dimensional coordinate diagrams of FIGS. 2A~2D.

Figure 1:
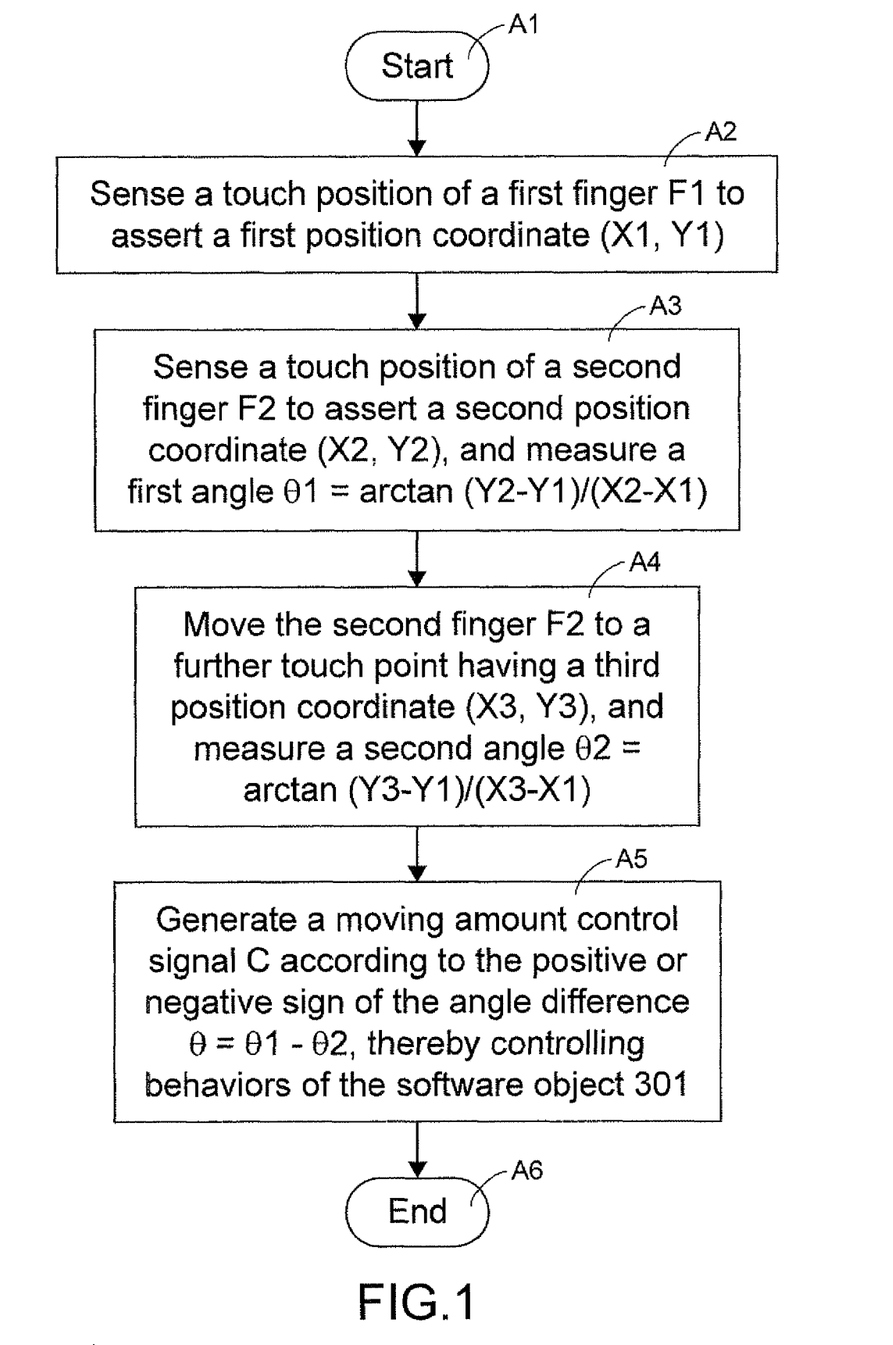
FIG. 1 is a flowchart illustrating a method of operating a touch pad according to a first preferred embodiment of the present invention.
Figure 2A:
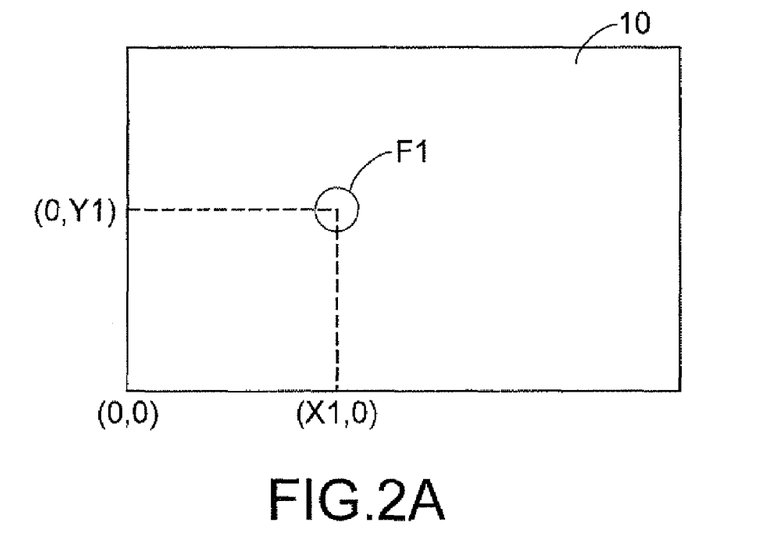
FIGS. 2A~2D are schematic two-dimensional coordinate diagrams illustrating the operating principles of the first preferred embodiment.

When a first object (e.g. a first finger F1) is placed on a touch position of the touch pad 10 (Step A1), the coordinate of the touch point is detected so as to assert a first position coordinate (X1, Y1), as is shown in FIG. 2A and Step A2 of FIG. 1.

Figure 2B:
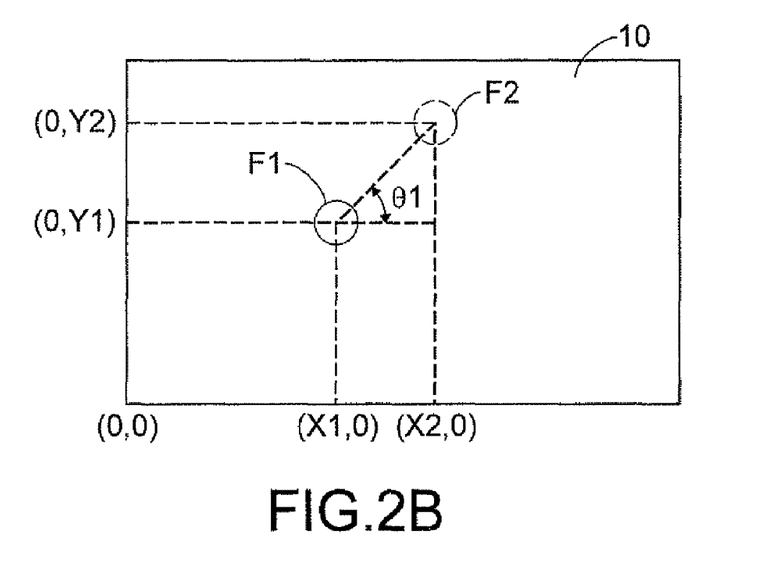

Next, as shown in FIG. 2B and Step A3 of FIG. 1, when a second object (e.g. a second finger F2) is placed on another touch point of the touch pad 10, the coordinate of the touch point is detected so as to assert a second position coordinate (X2, Y2). With the first position coordinate serving as a reference point, a first movement amount index indicating a relation between the first position coordinate (X1, Y1) and the second position coordinate (X2, Y2) is measured. In this embodiment, the first movement amount index is for example a first angle θ1, i.e. θ1=arctan (Y2-Y1)/(X2-X1).

Figure 2C:
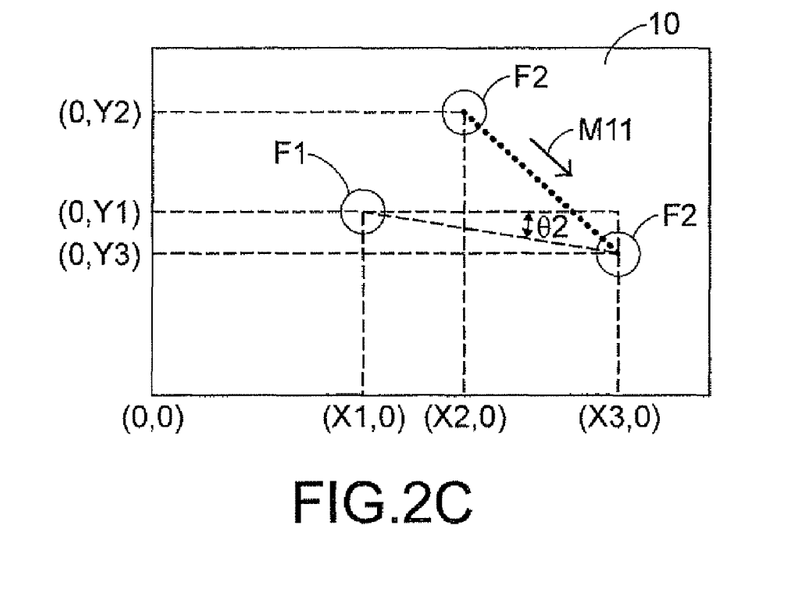

Next, as shown in FIG. 2C and Step A4 of FIG. 1, when the second finger F2 is moved to and stayed at a further touch point of the touch pad 10, the coordinate of the touch point is detected so as to assert a third position coordinate (X3, Y3). In this embodiment, the second finger F2 is moved from the initial position (i.e. the second position coordinate (X2, Y2)) to a destination position (i.e. the third position coordinate (X3, Y3)) in a clockwise direction M11. With the first position coordinate serving as a reference point, a second movement amount index indicating a relation between the first position coordinate (X1, Y1) and the third position coordinate (X3, Y3) is measured. In this embodiment, the second movement amount index is for example a second angle θ2, i.e. θ2=arctan (Y3-Y1)/(X3-X1).

Figure 2D:
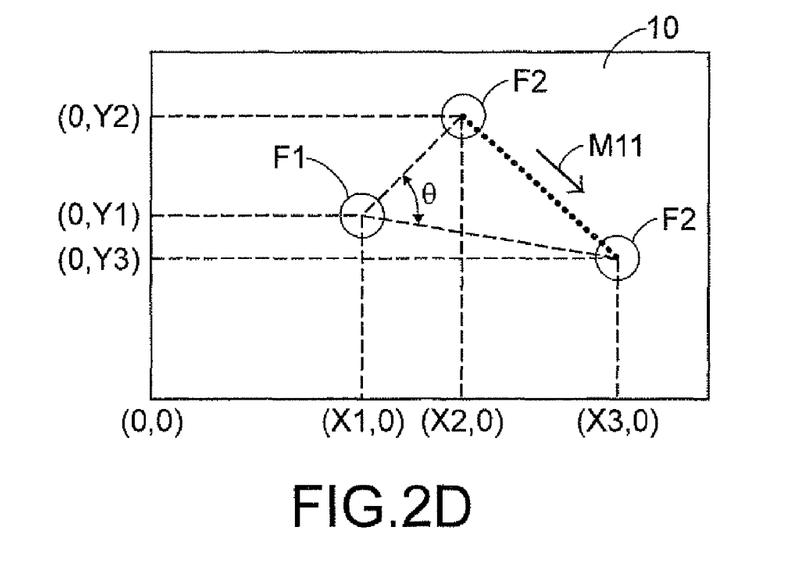
Figure 4A:
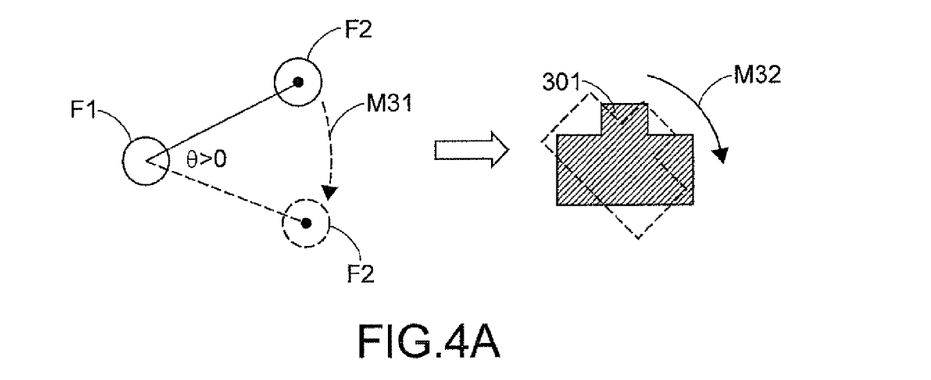
FIGS. 4A and 4B are schematic diagrams illustrating another implementation example of controlling rotational amount and rotational direction of an image according to the angle difference.
Figure 4B:
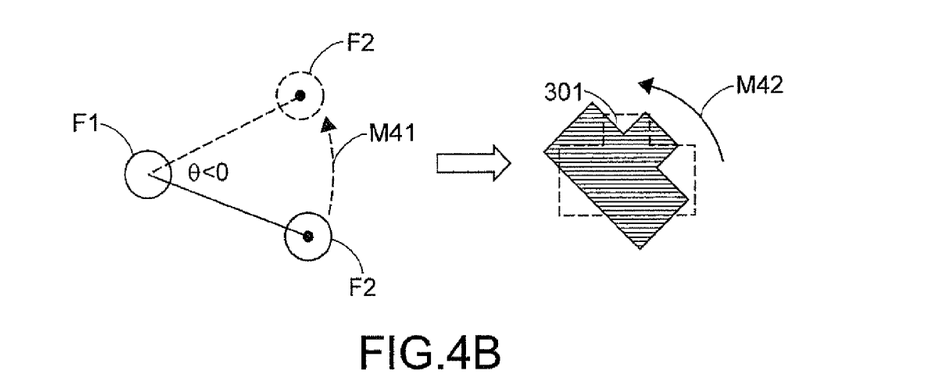
Figure 5:
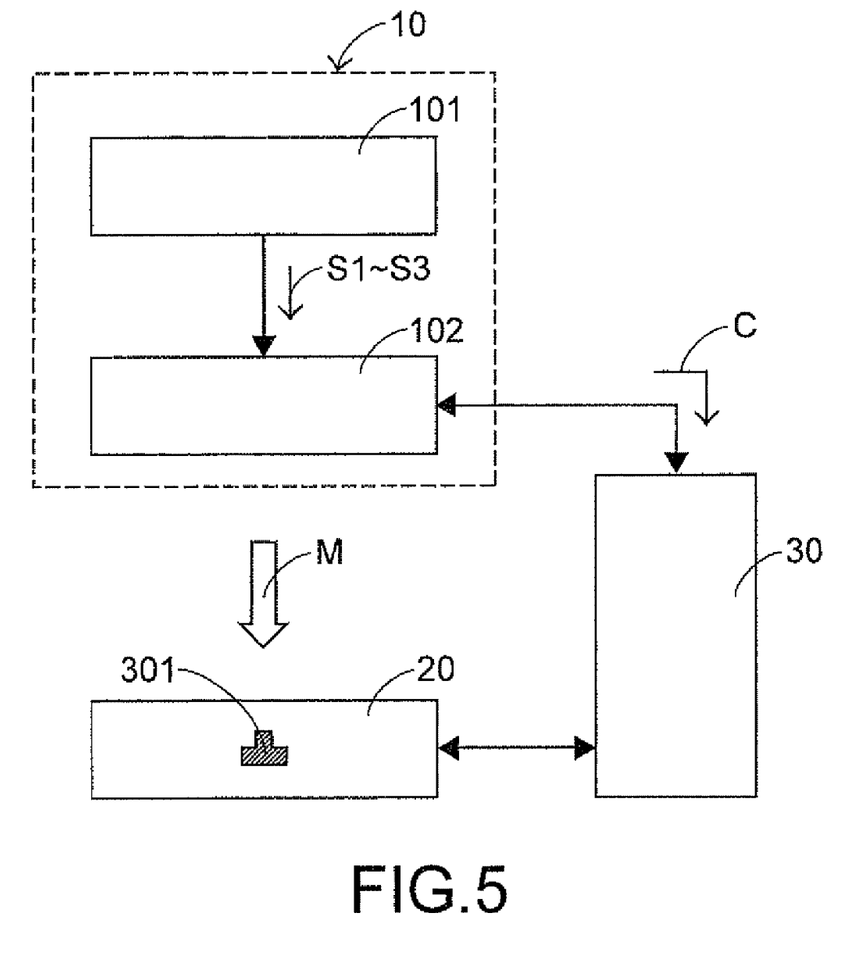
FIG. 5 is schematic block diagram illustrating an interpreting system of the touch pad according to the present invention.

As shown in FIG. 2D and Step A5 of FIG. 1, an angle difference θ between the first angle θ1 and the second angle θ2 is calculated. According to the positive or negative sign of the angle difference θ, a movement amount control signal C is generated to control behaviors of a software object 301. Some exemplary behaviors of the software object 301 to be controlled in response to the movement amount control signal C are shown in FIGS. 4A, 4B and 5, which will be described later. In a case that θ=θ1−θ2<0, the rotational movement amount has a negative sign. Whereas, the rotational movement amount has a positive sign if θ=θ1−θ2>0.

An implementation example of controlling the behaviors of the software object 301 according to the angle difference θ will be illustrated with reference to FIG. 3A and FIG. 3B. In this embodiment, the software object 301 is a volume control key. The behaviors of the software object 301 to be controlled include displacement amount and displacement direction of the volume control key.

Figure 3A:
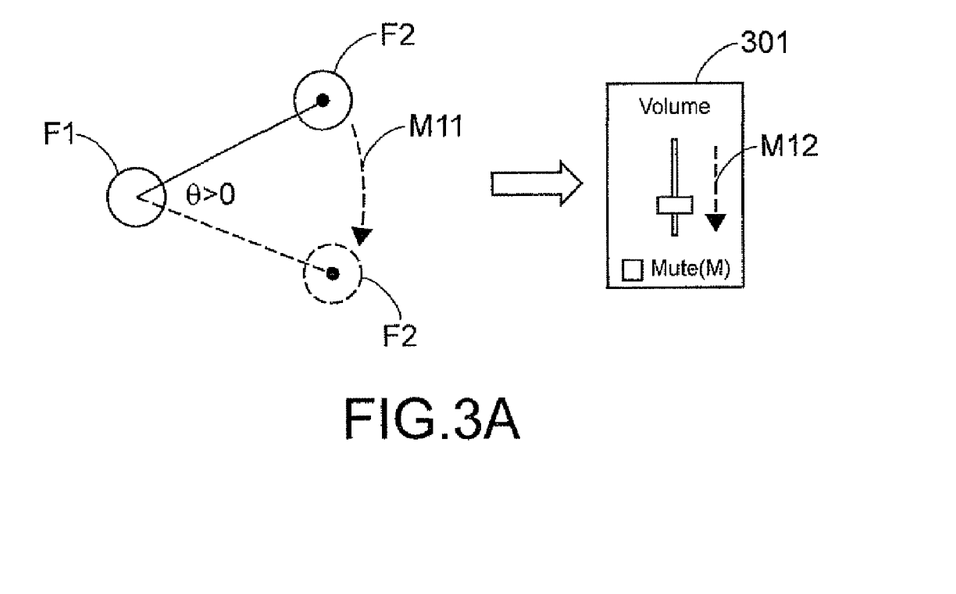
FIGS. 3A and 3B are schematic diagrams illustrating an implementation example of controlling displacement amount and displacement direction of a volume control key according to the angle difference.
Figure 3B:
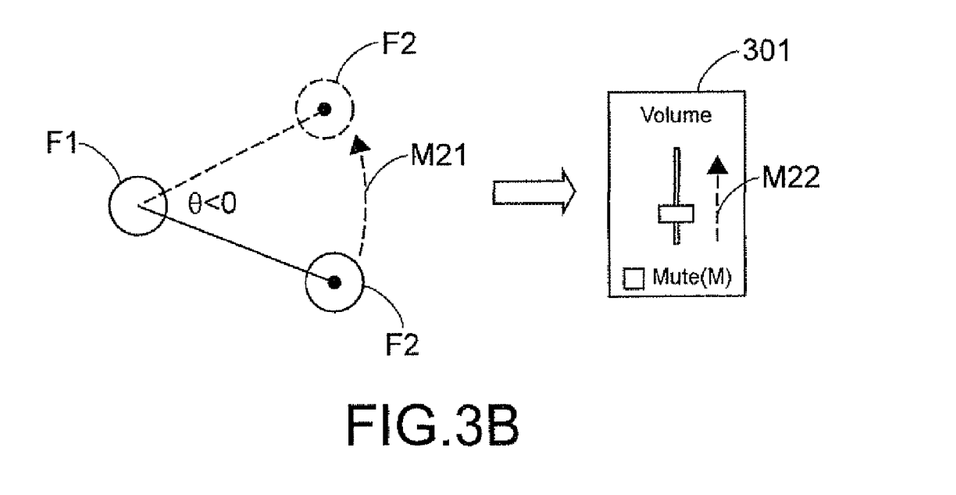

As shown in FIG. 3A, the first finger F1 is stayed at a touch position of the touch pad 10 as a reference point, the second finger F2 is moved from a initial position to a destination position in a clockwise direction M11. As previously described in FIGS. 2A-2B, a movement amount control signal C is generated. In response to the movement amount control signal C, the volume control indicator of the volume control key 301 moves downwardly (i.e. in a clockwise direction M12). On the contrary, as shown in FIG. 3B, if the second finger F2 is moved from an initial position to a destination position in a counterclockwise direction M21, the volume control indicator of the volume control key 301 moves upwardly (i.e. in a counterclockwise direction M22).

Another implementation example of controlling the behaviors of the software object 301 according to the angle difference θ will be illustrated with reference to FIG. 4A and FIG. 4B. In this embodiment, the software object 301 is for example a digital image. The behaviors of the software object 301 to be controlled include rotational amount and rotational direction of the digital image.

As shown in FIG. 4A, the first finger F1 is stayed at a touch position of the touch pad 10 as a reference point, the second finger F2 is moved from a initial position to a destination position in a clockwise direction M31. As is also described in FIGS. 2A-2B, a movement amount control signal C is generated. In response to the movement amount control signal C, the image 301 is rotated in the clockwise direction M32. On the contrary, as shown in FIG. 4B, if the second finger F2 is moved from an initial position to a destination position in a counterclockwise direction M41, the image 301 is rotated in the counterclockwise direction M42.

FIG. 5 is schematic block diagram illustrating an interpreting system of the touch pad according to the present invention. The interpreting system of FIG. 5 includes the touch pad 10, a display body 20 and a host 30.

The touch pad 10 is communicated with the host 30, and includes a touch structure 101 and a controller 102. The controller 102 is electrically communicated with the touch structure 101 and the host 30. The touch structure 101 is communicated with the host 30. For example, the lower surface of the touch structure 101 can be combined with the display body 20 by a mechanical assembling action M, as is shown in FIG. 5. Alternatively, the touch structure 101 can be electrically connected with the display body 20 (not shown). When the first finger F1 or the second finger F2 are respectively placed on first and second touch points on the upper surface of the touch pad 10, a first touching signal S1 and a second touching signal S2 are asserted to the controller 102. When the second finger F2 is moved to and stayed at a third touch point of the touch pad 10, a third touching signal S3 is asserted to the controller 102.

When the touching signals S1, S2 and S3 are received by the controller 102, a first position coordinate (X1, Y1), a second position coordinate (X2, Y2) and a third position coordinate (X3, Y3) are respectively generated. With the first position coordinate (X1, Y1) serving as a reference point, a first angle θ1 of the second position coordinate (X2, Y2) and a second angle θ2 of the third position coordinate (X3, Y3) are calculated. According to the positive or negative sign of the angle difference θ, a movement amount control signal C is asserted to the host 30. In response to the movement amount control signal C, the host 30 can control behaviors of the display information (i.e. the software object 301) shown on the display body 20.

In the first preferred embodiment as described in FIGS. 1, 2, 3 and 4, the software object 301 is rotated in either a clockwise direction or counterclockwise direction according to the angle difference. Nevertheless, the software object 301 can be controlled according to the slope of line through different touch points, thereby increasing the computing speed.

Figure 6:
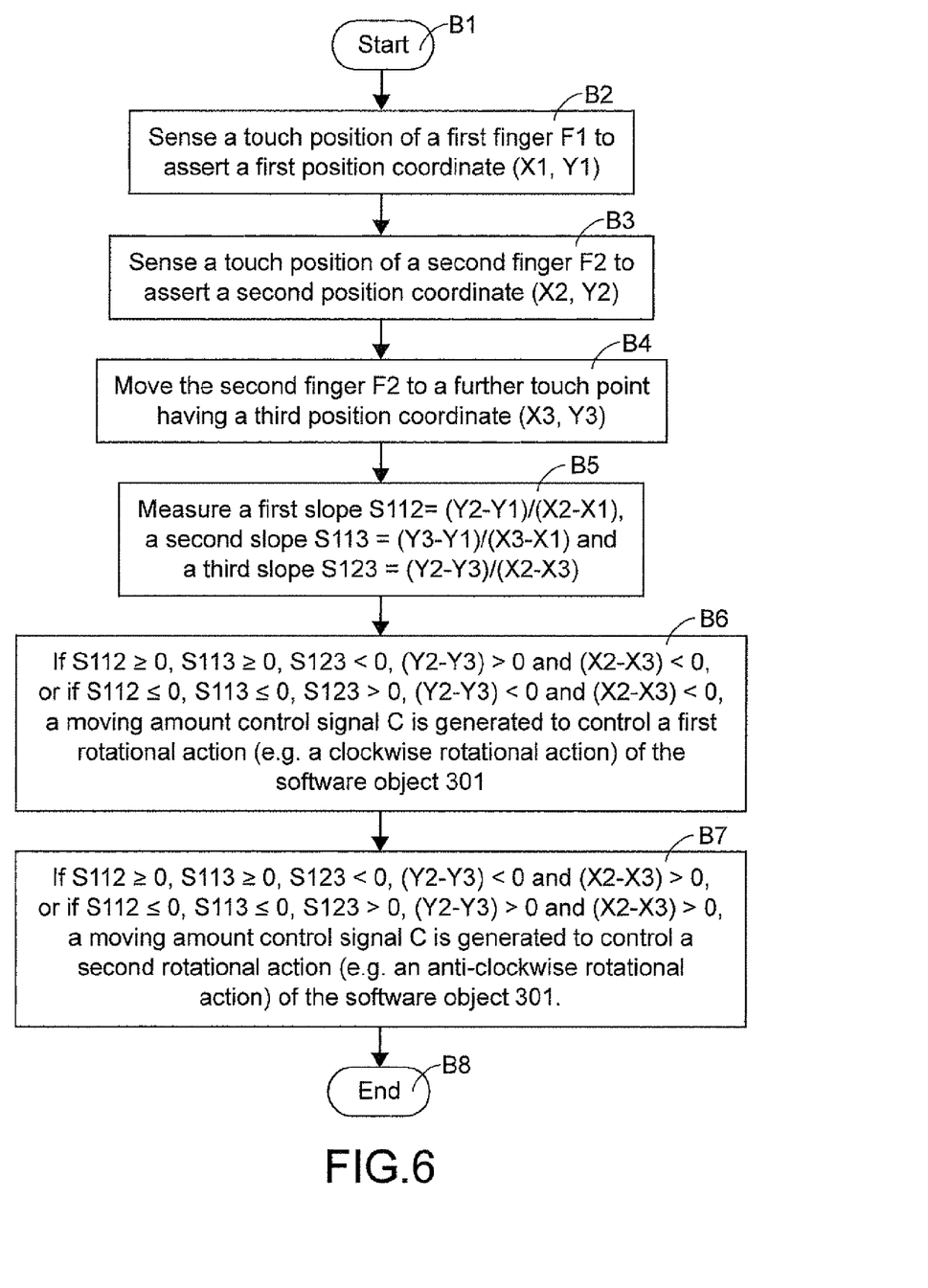
FIG. 6 is a flowchart illustrating a method of operating a touch pad according to a second preferred embodiment of the present invention.
Figure 7:
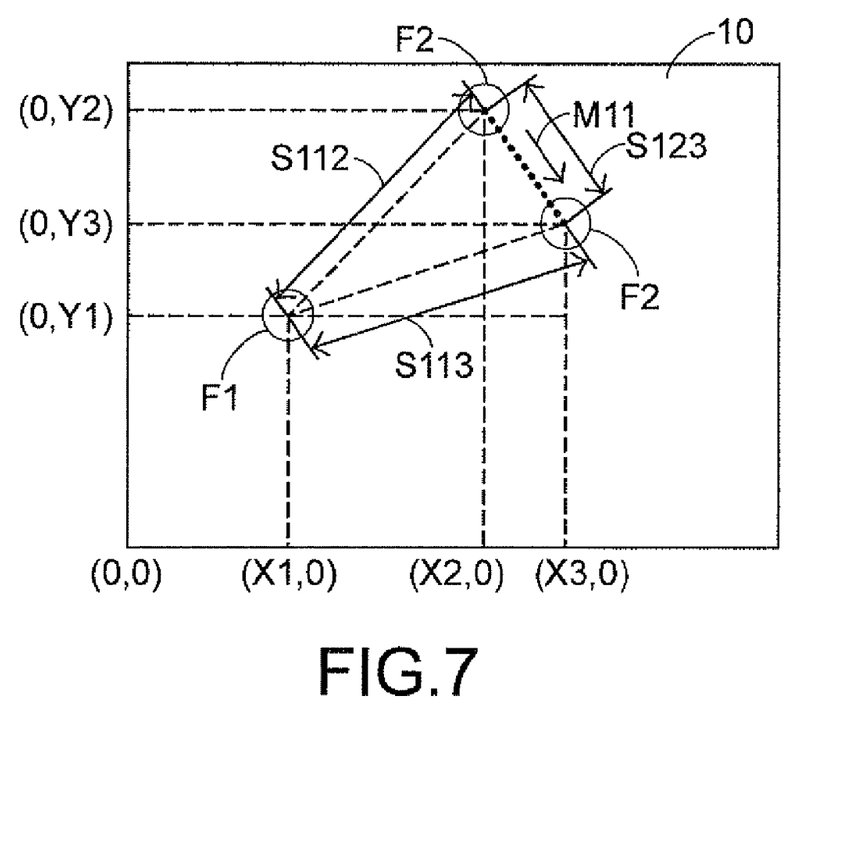
FIG. 7 is a schematic two-dimensional coordinate diagram illustrating operating principles of the second preferred embodiment.

Hereinafter, another embodiment of operating a touch pad according to the present invention will be illustrated with reference to the flowchart of FIG. 6 and the two-dimensional coordinate diagram of FIG. 7.

When a first object (e.g. a first finger F1) is placed on a touch position of the touch pad 10 (Step B1), the coordinate of the touch point is detected so as to assert a first position coordinate (X1, Y1) (Step B2).

In Step B3, when a second object (e.g. a second finger F2) is placed on another touch point of the touch pad 10, the coordinate of the touch point is detected so as to assert a second position coordinate (X2, Y2).

In Step B4, when the second finger F2 is moved to and stayed at a further touch point of the touch pad 10, the coordinate of the touch point is detected so as to assert a third position coordinate (X3, Y3). In this embodiment, the second finger F2 is moved from the initial position (i.e. the second position coordinate (X2, Y2)) to a destination position (i.e. the third position coordinate (X3, Y3)) in a clockwise direction M11.

In Step B5, a first slope S112 of the line through the first position coordinate (X1, Y1) and the second position coordinate (X2, Y2) is measured and defined as a first movement amount index, i.e. S112=(Y2−Y1)/(X2−X1). Likewise, a second slope S113 of the line through the first position coordinate (X1, Y1) and the third position coordinate (X3, Y3) is measured and defined as a second movement amount index, i.e. S113=(Y3−Y1)/(X3−X1). Likewise, a third slope S123 of the line through the second position coordinate (X2, Y2) and the third position coordinate (X3, Y3) is measured and defined as a third movement amount index, i.e. S123=(Y2−Y3)/(X2−X3).

In Step B6, if the first slope S112≧0, the second slope S113≧0, the third slope S123<0, (Y2−Y3)>0 and (X2−X3)<0, a movement amount control signal C is generated to control a first rotational action (e.g. a clockwise rotational action) of the software object 301. Alternatively, if the first slope S112≦0, the second slope S113≦0, the third slope S123>0, (Y2−Y3)<0 and (X2−X3)<0, the movement amount control signal C is also generated to control the first rotational action (e.g. a clockwise rotational action) of the software object 301.

In Step B7, if the first slope S112≧0, the second slope S113≧0, the third slope S123<0, (Y2−Y3)<0 and (X2−X3)>0, a movement amount control signal C is generated to control a second rotational action (e.g. a counterclockwise rotational action) of the software object 301. Alternatively, if the first slope S112≦0, the second slope S113≦0, the third slope S123>0, (Y2−Y3)>0 and (X2−X3)>0, the movement amount control signal C is also generated to control the second rotational action (e.g. a counterclockwise rotational action) of the software object 301.

Figure 8:
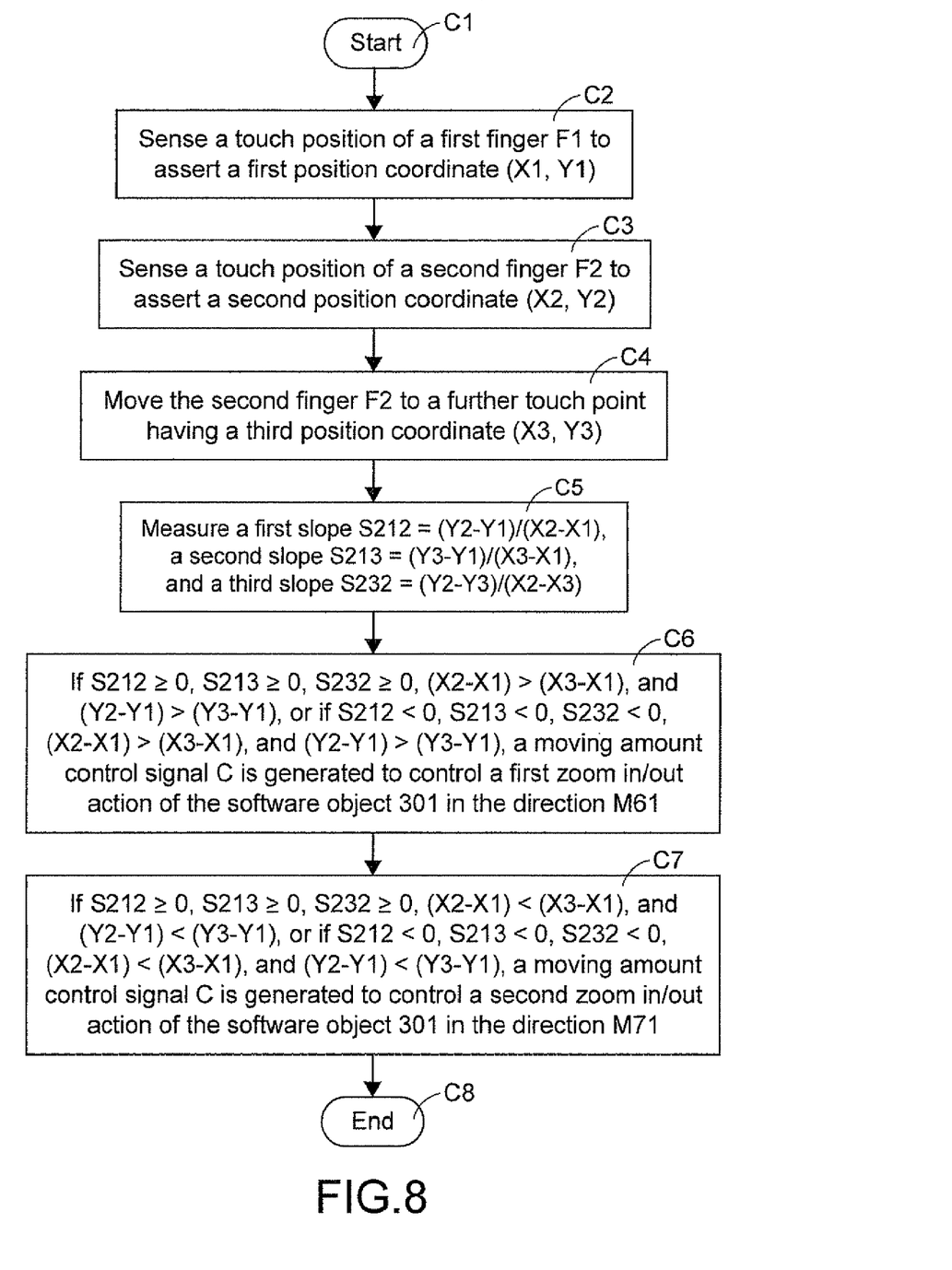
FIG. 8 is a flowchart illustrating a method of operating a touch pad according to a third preferred embodiment of the present invention.
Figure 9:
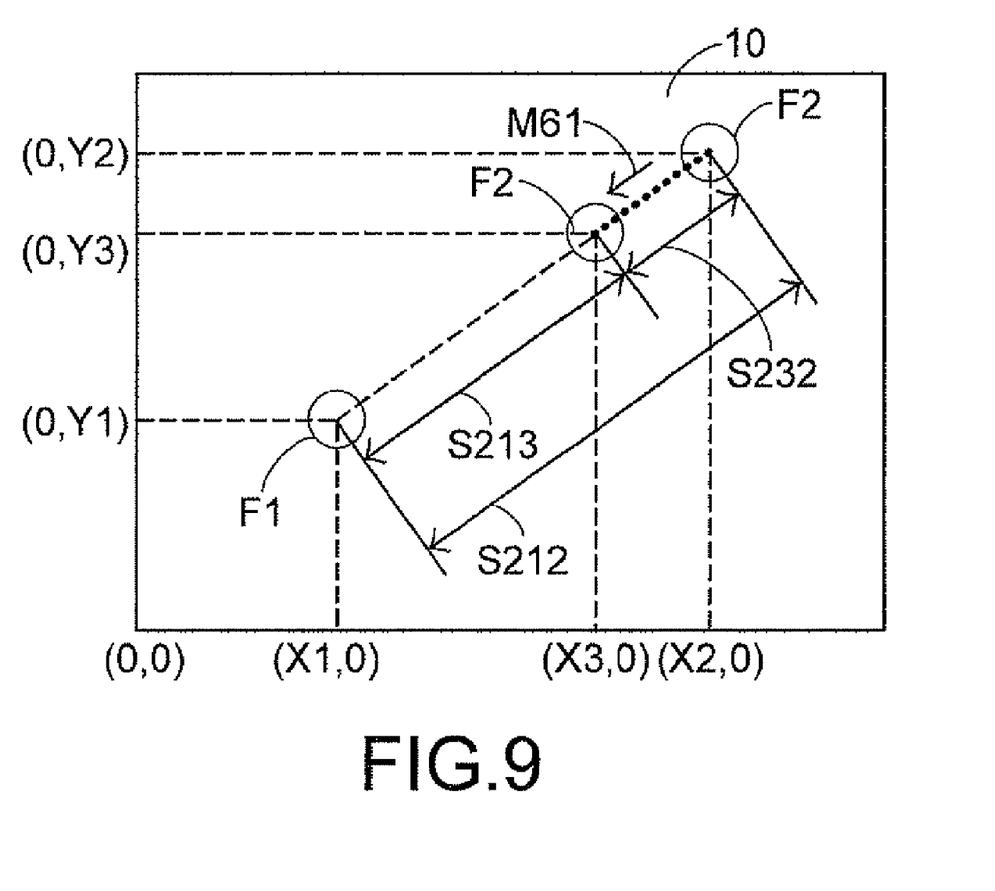
FIG. 9 is a schematic two-dimensional coordinate diagram illustrating the operating principles of the third preferred embodiment.

Hereinafter, another embodiment of operating a touch pad according to the present invention will be illustrated with reference to the flowchart of FIG. 8 and the two-dimensional coordinate diagram of FIG. 9. In this embodiment, two fingers are employed to zoom in or out of a digital image.

When a first object (e.g. a first finger F1) is placed on a touch position of the touch pad 10 (Step C1), the coordinate of the touch point is detected so as to assert a first position coordinate (X1, Y1) (Step C2).

In Step C3, when a second object (e.g. a second finger F2) is placed on another touch point of the touch pad 10, the coordinate of the touch point is detected so as to assert a second position coordinate (X2, Y2).

In Step C4, when the second finger F2 is moved to and stayed at a further touch point of the touch pad 10, the coordinate of the touch point is detected so as to assert a third position coordinate (X3, Y3). In this embodiment, the second finger F2 is moved from the initial position (i.e. the second position coordinate (X2, Y2)) to a destination position (i.e. the third position coordinate (X3, Y3)) in a zoom-out direction M61.

In Step C5, a first slope S212 of the line through the first position coordinate (X1, Y1) and the second position coordinate (X2, Y2) is measured and defined as a first movement amount index, i.e. S212=(Y2-Y1)/(X2-X1). Likewise, a second slope S213 of the line through the first position coordinate (X1, Y1) and the third position coordinate (X3, Y3) is measured and defined as a second movement amount index, i.e. S213=(Y3-Y1)/(X3-X1). Likewise, a third slope S232 of the line through the third position coordinate (X3, Y3) and the second position coordinate (X2, Y2) is measured and defined as a third movement amount index, i.e. S232=(Y2-Y3)/(X2-X3).

Figure 10A:
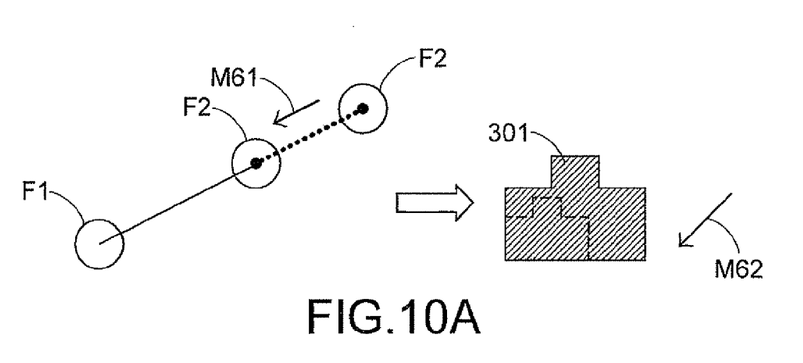
FIGS. 10A and 10B are schematic diagrams illustrating another implementation example of controlling zoom in/out amount and zoom in/out direction of the digital image.

In Step C6, if the first slope S212≧0, the second slope S213≧0, the third slope S232≧0, (X2-X1)>(X3-X1), and (Y2-Y1)>(Y3-Y1), a movement amount control signal C is generated to control a first zoom in/out action (e.g. a zoom-out action in the direction M61 as shown in FIG. 10A) of the software object 301. Alternatively, if the first slope S212<0, the second slope S213<0, the third slope S232<0, (X2-X1)>(X3-X1), and (Y2-Y1)>(Y3-Y1), the movement amount control signal C is also generated to control the first zoom in/out action (e.g. a zoom-out action in the direction M61 as shown in FIG. 10A) of the software object 301.

Figure 10B:
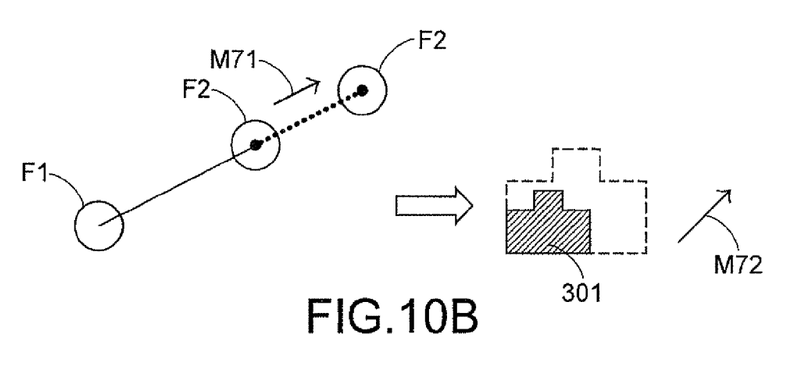

In Step C7, if the first slope S212≧0, the second slope S213≧0, the third slope S232≧0, (X2-X1)<(X3-X1), and (Y2-Y1)<(Y3-Y1), a movement amount control signal C is generated to control a second zoom in/out action (e.g. a zoom-in action in the direction M71 as shown in FIG. 10B) of the software object 301. Alternatively, if the first slope S212<0, the second slope S213<0, the third slope S232<0, (X2-X1)<(X3-X1), and (Y2-Y1)<(Y3-Y1), the movement amount control signal C is also generated to control the second zoom in/out action (e.g. a zoom-in action in the direction M71 as shown in FIG. 10B) of the software object 301.

Another implementation example of controlling the behaviors of the software object 301 will be illustrated with reference to FIG. 10A and FIG. 10B. In this embodiment, the software object 301 is a digital image. The behaviors of the software object 301 to be controlled include zoom in/out amount and zoom in/out direction of the digital image. As shown in FIG. 10A, the first finger F1 is stayed at a touch position of the touch pad 10 as a reference point and the second finger F2 comes closer to the first finger F1 in the direction M61, so that the image 301 is squeezed in the zoom out direction M62. On the contrary, as shown in FIG. 10B, the first finger F1 is stayed at a touch position of the touch pad 10 as a reference point and the second finger F2 is spread apart from the first finger F1 in the direction M71, so that the image 301 is stretched in the zoom in/out direction M72.

Figure 11:
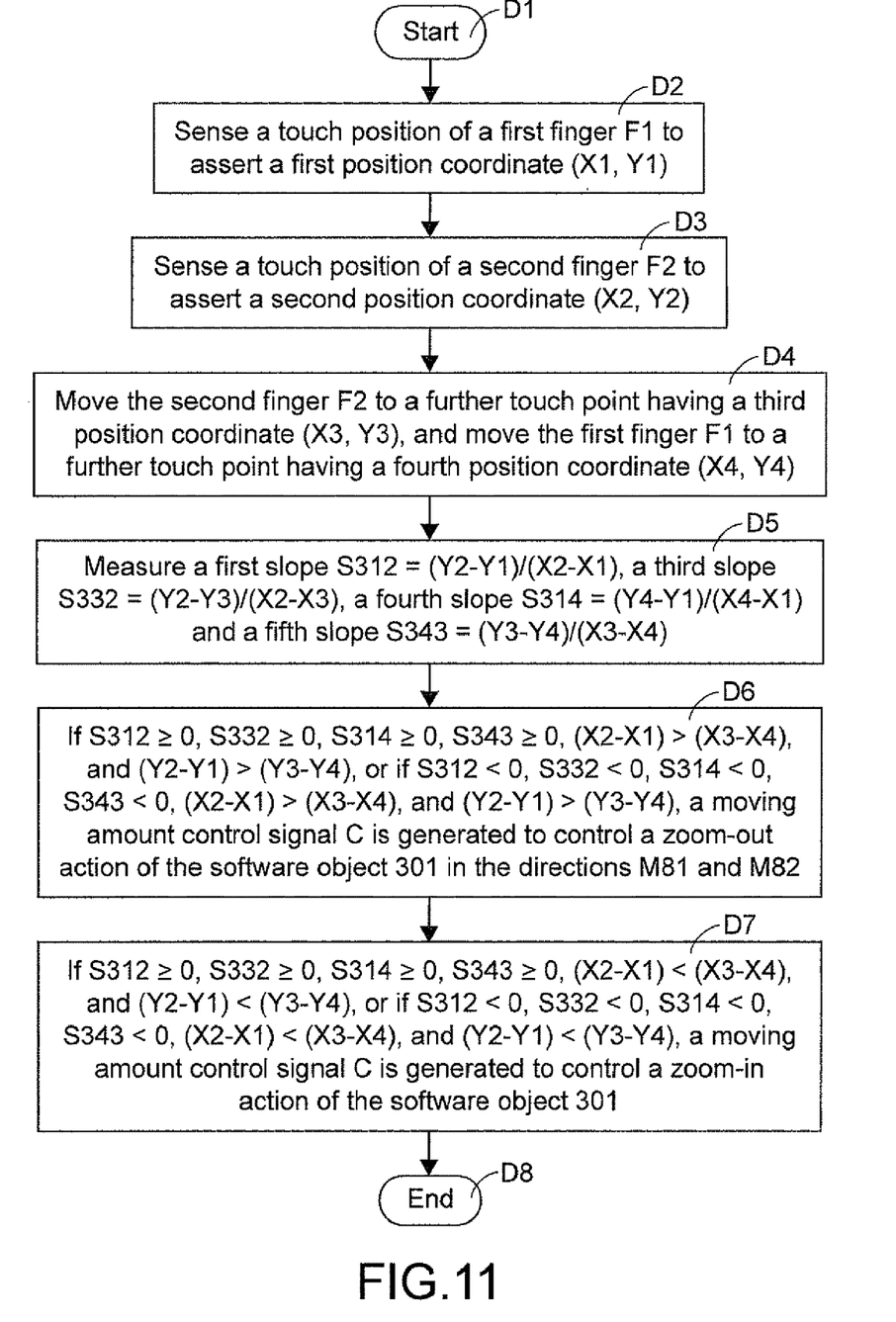
FIG. 11 is a flowchart illustrating a method of operating a touch pad according to a fourth preferred embodiment of the present invention.

Hereinafter, a further embodiment of operating a touch pad according to the present invention will be illustrated with reference to the flowchart of FIG. 11 and the two-dimensional coordinate diagram of FIG. 12. In this embodiment, two fingers are simultaneously moved to zoom in or out of an image.

When a first object (e.g. a first finger F1) is placed on a touch position of the touch pad 10 (Step D1), the coordinate of the touch point is detected so as to assert a first position coordinate (X1, Y1) (Step C2).

In Step D3, when a second object (e.g. a second finger F2) is placed on another touch point of the touch pad 10, the coordinate of the touch point is detected so as to assert a second position coordinate (X2, Y2).

In Step D4, the first finger F1 and the second finger F2 are simultaneously moved. When the second finger F2 and the first finger F1 are moved to and stayed at specified touch points of the touch pad 10, the coordinates of the touch points are detected so as to respectively assert a third position coordinate (X3, Y3) and a fourth position coordinate (X4, Y4). In this embodiment, the second finger F2 is moved from the initial position (i.e. the second position coordinate (X2, Y2)) to the destination position (i.e. the third position coordinate (X3, Y3)) in a first zoom-out direction M81. In addition, the first finger F1 is moved from the initial position (i.e. the first position coordinate (X1, Y1)) to the destination position (i.e. the fourth position coordinate (X4, Y4)) in a second zoom-out direction M82.

In Step D5, a first slope S312 of the line through the first position coordinate (X1, Y1) and the second position coordinate (X2, Y2) is measured and defined as a first movement amount index, i.e. S312=(Y2-Y1)/(X2-X1). Likewise, a third slope S332 of the line through the third position coordinate (X3, Y3) and the second position coordinate (X2, Y2) is measured and defined as a third movement amount index, i.e. S332=(Y2-Y3)/(X2-X3). Likewise, a fourth slope S314 of the line through the first position coordinate (X1, Y1) and the fourth position coordinate (X4, Y4) is measured and defined as a fourth movement amount index, i.e. S314=(Y4-Y1)/(X4-X1). Likewise, a fifth slope S343 of the line through the fourth position coordinate (X4, Y4) and the third position coordinate (X3, Y3) is measured and defined as a fifth movement amount index, i.e. S343=(Y3-Y4)/(X3-X4).

Figure 12:
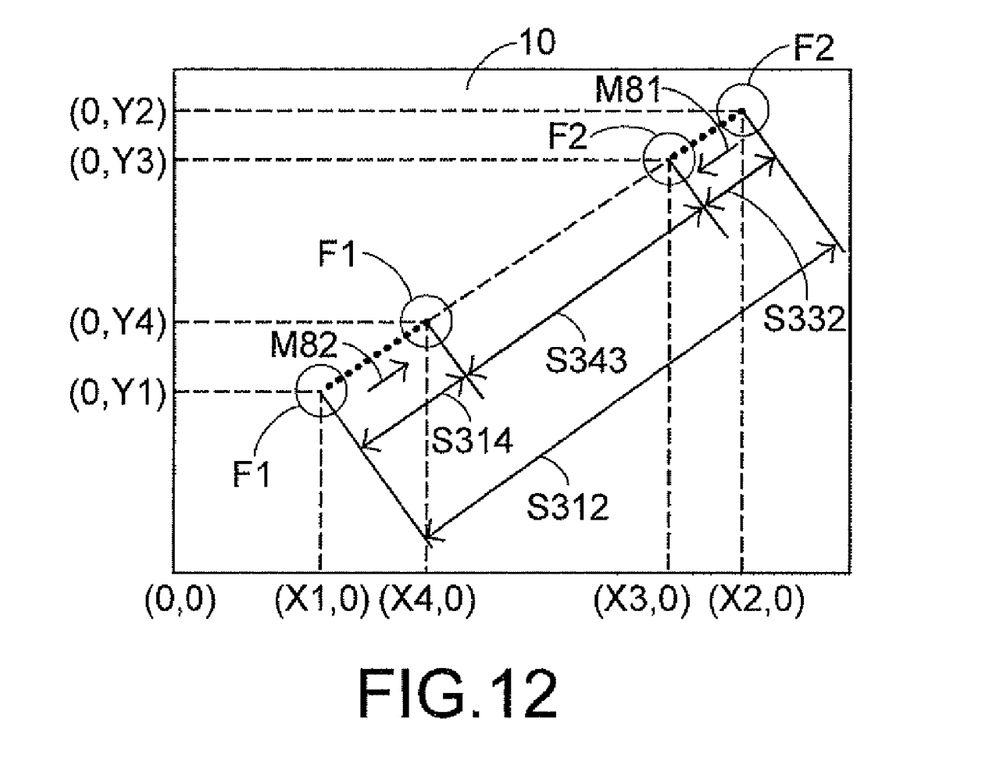
FIG. 12 is a schematic two-dimensional coordinate diagram illustrating the operating principles of the fourth preferred embodiment.

In Step D6, if the first slope S312≧0, the third slope S332≧0, the fourth slope S314≧0, the fifth slope S343≧0, (X2-X1)>(X3-X4), and (Y2-Y1)>(Y3-Y4), a movement amount control signal C is generated to control a zoom-out action of the software object 301 in the directions M81 and M82 (as shown in FIG. 12). Alternatively, if S312<0, the third slope S332<0, the fourth slope S314<0, the fifth slope S343<0, (X2-X1)>(X3-X4), and (Y2-Y1)>(Y3-Y4), the movement amount control signal C is also generated to control the zoom-out action of the software object 301 in the directions M81 and M82 (as shown in FIG. 12).

In Step D7, if the first slope S312≧0, the third slope S332≧0, the fourth slope S314≧0, the fifth slope S343≧0, (X2-X1)<(X3-X4), and (Y2-Y1)<(Y3-Y4), a movement amount control signal C is generated to control a zoom-in action (not shown) of the software object 301. Alternatively, if S312<0, the third slope S332<0, the fourth slope S314<0, the fifth slope S343<0, (X2-X1)<(X3-X4), and (Y2-Y1)<

(Y3-Y4), the movement amount control signal C is also generated to control the zoom in/out action (not shown) of the software object 301.

From the above embodiment, the method of the present invention can use two fingers to operate the touch pad to rotate the software object at a specified angle, move the software object along multi-directions with two fingers, and zoom in/out the software object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of operating a touch pad with multi-objects, comprising steps of:
   sensing touch points of first and second fingers on said touch pad to assert a first position coordinate (X1, Y1) and a second position coordinate (X2, Y2), respectively;
   moving said second finger on said touch pad to a first further touch point, and sensing said first further touch point to assert a third position coordinate (X3, Y3) and moving said first finger on said touch pad to a second further touch point, and sensing said second further touch point to assert a fourth position coordinate (X4, Y4);
   measuring a first slope S12 according to said first position coordinate (X1, Y1) and said second position coordinate (X2, Y2), measuring a second slope S13 according to said first position coordinate (X1, Y1) and said third position coordinate (X3, Y3), measuring a third slope S23 according to said second position coordinate (X2, Y2) and said third position coordinate (X3, Y3), and measuring a fourth slope S14 according to said first position coordinate (X1, Y1) and said fourth position coordinate (X4, Y4), and measuring a fifth slope S43 according to said fourth position coordinate (X4, Y4) and said third position coordinate (X3, Y3);
   generating a movement amount control signal according to said first slope S12, said second slope S13, said third slope S23, said first position coordinate (X1, Y1), said second position coordinate (X2, Y2) and said third position coordinate (X3, Y3)
   generating said movement amount control signal to control a first zoom in/out action of a software object if S12≧0, S23≧0, S14≧0, S43≧0, (X2-X1)>(X3-X4), and (Y2-Y1)>(Y3-Y4), or if S12<0, S23<0, S14<0, S43<0, (X2-X1)>(X3-X4), and (Y2-Y1)>(Y3-Y4); and
   generating said movement amount control signal to control a second zoom in/out action of said software object if S12≧0, S23≧0, S14≧0, S43≧0, (X2-X1)<(X3-X4), and (Y2-Y1)<(Y3-Y4), or if S12<0, S23<0, S14<0, S43<0, (X2-X1)<(X3-X4), and (Y2-Y1)<(Y3-Y4),
   wherein said first, second, third and fourth position coordinates are obtained in an absolute two-dimensional coordinate system or a relative two-dimensional coordinate system, and
   wherein said first zoom in/out action and said second zoom in/out action are respectively a zoom out action and a zoom in action, said software object is a digital image, and said behaviors of said software object include zoom in/out amount and zoom in/out direction of said digital image.

2. The method according to claim 1 further comprising steps of:
   generating said movement amount control signal to control a first rotational action of a software object if S12≧0, S13≧0, S23<0, (Y2-Y3)>0 and (X2-X3)<0, or if S12≧0, S13≧0, S23>0, (Y2-Y3)<0 and (X2-X3)<0; and
   generating said movement amount control signal to control a second rotational action of said software object if S12≧0, S13≧0, S23<0, (Y2-Y3)<0 and (X2-X3)>0, or if S12≧0, S13≧0, S23>0, (Y2-Y3)>0 and (X2-X3)>0;
   wherein said first rotational action and said second rotational action are respectively a clockwise rotational action and a counterclockwise rotational action, said software object is a volume control key and said behaviors of said software object include displacement amount and displacement direction of said volume control key, or said software object is a digital image and said behaviors of said software object include rotational amount and rotational direction of the digital image.

3. The method according to claim 1 further comprising steps of:
   generating said movement amount control signal to control a first zoom in/out action of a software object if S12≧0, S13≧0, S23≧0, (X2-X1)>(X3-X1), and (Y2-Y1)>(Y3-Y1), or if S12<0, S13<0, S23<0, (X2-X1)>(X3-X1), and (Y2-Y1)>(Y3-Y1); and
   generating said movement amount control signal to control a second zoom in/out action of said software object if S12≧0, S13≧0, S23≧0, (X2-X1)<(X3-X1), and (Y2-Y1)<(Y3-Y1), or if S12<0, S13<0, S23<0, (X2-X1)<(X3-XI), and (Y2-Y1)<(Y3-Y1),
   wherein said first zoom in/out action and said second zoom in/out action are respectively a zoom out action and a zoom in action, said software object is a digital image, and said behaviors of said software object include zoom in/out amount and zoom in/out direction of said digital image.

4. A touch pad operable with multi-objects, said touch pad being communicated with a host and a display body and comprising:
   a touch structure having a lower surface communicated with said display body and an upper surface for sensing touch points, wherein first and second touching signals are respectively generated when touch points of first and second fingers on said touch pad are sensed, a third touching signal is generated when said second finger is moved on said touch pad to a first further touch point and said further touch point is sensed, and a fourth touching signal is generated when said first finger is moved on said touch pad to a second further touch point and said second further touch point is sensed; and
   a controller electrically connected to said touch structure and said host for receiving said first, second, third and fourth touching signals and generating a first position coordinate (X1, Y1), a second position coordinate (X2, Y2), a third position coordinate (X3, Y3) and a fourth position coordinate (X4, Y4), respectively, wherein said controller calculates a first slope S12, a second slope S13, a third slope S23, a fourth slope S14 and a fifth slope S43 according to coordinate differences between said first, second, third and fourth position coordinates, thereby generating a movement amount control signal, wherein said touch pad is operated by the following steps of:

generating said movement amount control signal to control a first zoom in/out action of a software object if $S12 \geq 0$, $S23 \geq 0$, $S14 \geq 0$, $S43 \geq 0$, $(X2-X1)>(X3-X4)$, and $(Y2-Y1)>(Y3-Y4)$, or if $S12<0$, $S23<0$, $S14<0$, $S43<0$, $(X2-X1)>(X3-X4)$, and $(Y2-Y1)>(Y3-Y4)$; and generating said movement amount control signal to control a second zoom in/out action of said software object if $S12 \geq 0$, $S23 \geq 0$, $S14 \geq 0$, $S43 \geq 0$, $(X2-X1)<(X3-X4)$, and $(Y2-Y1)<(Y3-Y4)$, or if $S12<0$, $S23<0$, $S14<0$, $S43<0$, $(X2-X1)<(X3-X4)$, and $(Y2-Y1)<(Y3-Y4)$, wherein said first, second, third and fourth position coordinates are obtained in an absolute two-dimensional coordinate system or a relative two-dimensional coordinate system, and wherein said first zoom in/out action and said second zoom in/out action are respectively a zoom out action and a zoom in action, said software object is a digital image, and said behaviors of said software object include zoom in/out amount and zoom in/out direction of said digital image.

5. The touch pad according to claim 4 wherein said touch pad is operated by the following steps of:

generating said movement amount control signal to control a first rotational action of said software object if $S12 \geq 0$, $S13 \geq 0$, $S23<0$, $(Y2-Y3)>0$ and $(X2-X3)<0$, or if $S12 \geq 0$, $S13 \geq 0$, $S23>0$, $(Y2-Y3)<0$ and $(X2-X3)<0$; and generating said movement amount control signal to control a second rotational action of said software object if $S12 \geq 0$, $S13 \geq 0$, $S23<0$, $(Y2-Y3)<0$ and $(X2-X3)>0$, or if $S12 \geq 0$, $S13 \geq 0$, $S23>0$, $(Y2-Y3)>0$ and $(X2-X3)>0$, wherein said first rotational action and said second rotational action are respectively a clockwise rotational action and a counterclockwise rotational action, said software object is a volume control key and said behaviors of said software object include displacement amount and displacement direction of said volume control key, or said software object is a digital image and said behaviors of said software object include rotational amount and rotational direction of the digital image.

6. The touch pad according to claim 4 wherein said touch pad is operated by the following steps of:

generating said movement amount control signal to control a first zoom in/out action of said software object if $S12\_\_>0$, $S13\_\_>0$, $S23\_\_>0$, $(X2-X1)>(X3-X1)$, and $(Y2-Y1)>(Y3-Y1)$, or if $S12$ 0, $S13$ 0, $S23$ 0, $(X2-X1)>(X3-X1)$, and $(Y2-Y1)>(Y3-Y1)$; and generating said movement amount control signal to control a second zoom in/out action of said software object if $S12 \geq 0$, $S13 \geq 0$, $S23 \geq 0$, $(X2-X1)>(X3-X1)$, and $(Y2-Y1)<(Y3-Y1)$, or if $S12<0$, $S13<0$, $S23<0$, $(X2-X1)<(X3-X1)$, and $(Y2-Y1)<(Y3-Y1)$, wherein said first zoom in/out action and said second zoom in/out action are respectively a zoom out action and a zoom in action, said software object is a digital image, and said behaviors of said software object include zoom in/out amount and zoom in/out direction of said digital image.

* * * * *